(12) United States Patent
Ge et al.

(10) Patent No.: US 9,489,943 B2
(45) Date of Patent: Nov. 8, 2016

(54) SYSTEM AND METHOD FOR LEARNING ALTERNATE PRONUNCIATIONS FOR SPEECH RECOGNITION

(71) Applicant: Interactive Intelligence Group, Inc., Indianapolis, IN (US)

(72) Inventors: Zhenhao Ge, Zionsville, IN (US); Vivek Tyagi, New Delhi (IN); Aravind Ganapathiraju, Hyderabad (IN); Ananth Nagaraja Iyer, Carmel, IN (US); Scott Allen Randal, Redmond, WA (US); Felix Immanuel Wyss, Zionsville, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 0 days.

(21) Appl. No.: 14/515,607

(22) Filed: Oct. 16, 2014

(65) Prior Publication Data
US 2015/0106082 A1  Apr. 16, 2015

Related U.S. Application Data

(60) Provisional application No. 61/891,850, filed on Oct. 16, 2013.

(51) Int. Cl.
| | |
|---|---|
| *G10L 15/187* | (2013.01) |
| *G06F 17/28* | (2006.01) |
| *G09B 19/04* | (2006.01) |
| *G10L 15/06* | (2013.01) |
| *G09B 19/06* | (2006.01) |

(52) U.S. Cl.
CPC ............ *G10L 15/187* (2013.01); *G06F 17/28* (2013.01); *G09B 19/04* (2013.01); *G09B 19/06* (2013.01); *G10L 15/063* (2013.01)

(58) Field of Classification Search
CPC .............................. G10L 15/187; G09B 19/06
USPC ......................................................... 704/274
See application file for complete search history.

(56) References Cited

U.S. PATENT DOCUMENTS

| | | | |
|---|---|---|---|
| 7,630,899 B1 * | 12/2009 | Brown | G10L 15/06 704/1 |
| 7,756,708 B2 * | 7/2010 | Cohen | G10L 15/065 704/243 |
| 8,275,619 B2 | 9/2012 | Herbig et al. | |
| 2002/0087313 A1 | 7/2002 | Lee et al. | |

(Continued)

OTHER PUBLICATIONS

International Search Report mailed on Feb. 5, 2015 in related International Application PCT/US2014/060798 (filing date Oct. 16, 2014).

(Continued)

*Primary Examiner* — Marcellus Augustin (57) ABSTRACT

A system and method for learning alternate pronunciations for speech recognition is disclosed. Alternative name pronunciations may be covered, through pronunciation learning, that have not been previously covered in a general pronunciation dictionary. In an embodiment, the detection of phone-level and syllable-level mispronunciations in words and sentences may be based on acoustic models trained by Hidden Markov Models. Mispronunciations may be detected by comparing the likelihood of the potential state of the targeting pronunciation unit with a pre-determined threshold through a series of tests. It is also within the scope of an embodiment to detect accents.

37 Claims, 6 Drawing Sheets

(56) References Cited

U.S. PATENT DOCUMENTS

| | | | |
|---|---|---|---|
| 2002/0087317 A1* | 7/2002 | Lee | G06Q 30/06 704/257 |
| 2003/0110035 A1 | 6/2003 | Thong et al. | |
| 2004/0153319 A1 | 8/2004 | Yacoub | |
| 2006/0031070 A1 | 2/2006 | Abrego et al. | |
| 2008/0147404 A1 | 6/2008 | Liu et al. | |
| 2008/0270118 A1 | 10/2008 | Kuo et al. | |
| 2009/0119105 A1 | 5/2009 | Kim et al. | |
| 2010/0145698 A1 | 6/2010 | Chen et al. | |

OTHER PUBLICATIONS

"Mispronunciation Detection for Language Learning and Speech Recognition Adaptation", Zhenhao Ge, Dissertation submitted to Purdue University, Dec. 2013.

Humphries, J.J. and P.C. Woodland, "Using Accent-Specific Pronunciation Modelling for Improved Large Vocabulary Continuous Speech Recognition", Cambridge University Engineering Department.

\* cited by examiner

SYSTEM AND METHOD FOR LEARNING ALTERNATE PRONUNCIATIONS FOR SPEECH RECOGNITION

BACKGROUND

The present invention generally relates to telecommunications systems and methods, as well as speech recognition. More particularly, the present invention pertains to pronunciation learning in a given language.

SUMMARY

A system and method for learning alternate pronunciations for speech recognition is disclosed. Alternative name pronunciations may be covered, through pronunciation learning, that have not been previously covered in a general pronunciation dictionary. In an embodiment, the detection of phone-level and syllable-level mispronunciations in words and sentences may be based on acoustic models trained by Hidden Markov Models. Mispronunciations may be detected by comparing the likelihood of the potential state of the targeting pronunciation unit with a pre-determined threshold through a series of tests. It is also within the scope of an embodiment to detect accents.

In one embodiment, a method for learning pronunciation in a given language is described, comprising the steps of: training an acoustic model on a large speech corpus to distinguish phonemes; constructing a phoneme confusion matrix; constructing a phoneme replacement candidate list for each phoneme in a set of speech data containing pronunciations for recognition; learning alternative pronunciations of a word that has been mispronounced; combining said learned alternative pronunciations with a linguistic dictionary to create a pooled dictionary; and pruning said pooled dictionary to limit the number of learned alternative pronunciations in order to create an improved dictionary.

In another embodiment, a method for learning alternative pronunciations for speech in a given language is described, comprising the steps of: selecting a word instance for learning alternative pronunciations; performing a first test on the word instance to determine a baseline recognition result; performing hierarchical pronunciation learning on the word instance and selecting a pronunciation that is similar to the word instance; and performing an other test to assess if the selected pronunciation is recognized as the word instance wherein if the word is recognized, adding the selected pronunciation to a dictionary, otherwise, discarding the selected pronunciation.

In another embodiment, a system for language learning of mispronunciation detection is presented comprising: a lexicon builder which is capable of integrating one or more of: pronunciation dictionaries, spelling-to-pronunciation interpretations, and text normalizations, to create a list of acceptable phoneme sequences; a speech corpus; an acoustic model; a word lexicon; a word grammar; a grammar-based recognizer which provides a hypothesized name based on the speech corpus, acoustic model, word lexicon, and the word grammar to a means for scoring; and a means for scoring which indicates accuracy of the hypothesized name.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

It should be noted that while "name" may be used in the following examples, it is within the scope of this application for "word(s)" to also apply.

Figure 1:
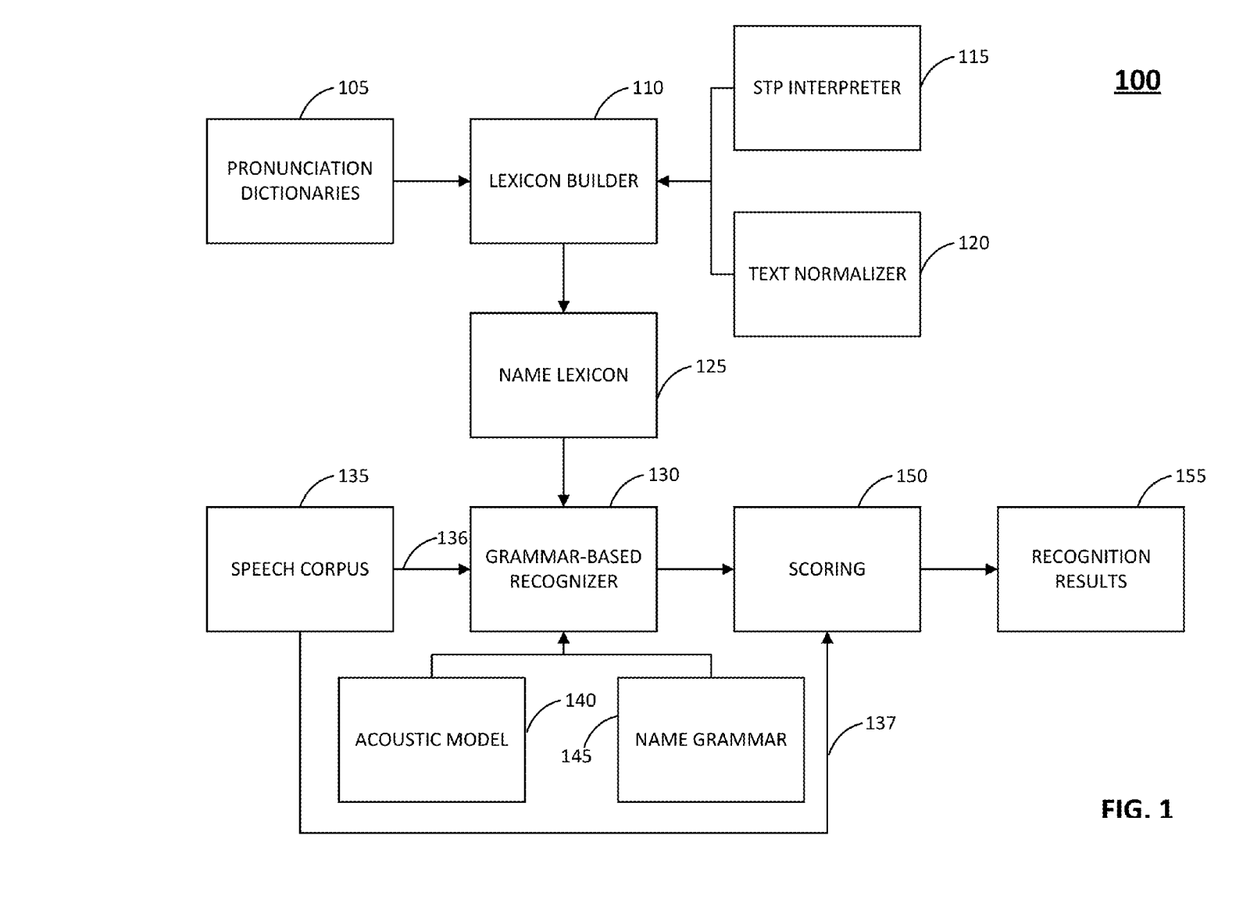
FIG. 1 is a diagram illustrating an embodiment of a system for grammar-based name recognition.

FIG. 1 illustrates an embodiment of a system for grammar-based name recognition, indicated generally at 100. The system may contain Pronunciation Dictionaries 105, Lexicon Builder 110, STP Interpreter 115, Text Normalizer 120, Name Lexicon 125, Grammar-based Recognizer 130, Speech Corpus 135, Acoustic Model 140, Name Grammar 145, Scoring Module 150 and Recognition Results 155.

The Pronunciation Dictionaries 105 may comprise dictionaries which are used by the Lexicon Builder 110. The dictionaries comprise lists of word-phoneme sequence pairs to specify the pronunciations allowed for each word. In an embodiment, a prototype dictionary, linguist dictionary, and a learned dictionary are utilized. Additional dictionaries may be utilized, such as a number of additional learned dictionaries. The prototype dictionary may comprise a prototype phoneme dictionary which specifies the attributes of a language's phonemes. The linguist dictionary may comprise a dictionary which is hand-crafted by linguists based on their knowledge. The learned dictionary may comprise a dictionary which is learned through the pronunciation learning process. Additionally, the learned dictionary may serve to supplement the accepted alternative pronunciations for uncommon words (e.g. foreign names). In an embodiment, the pronunciation dictionaries, generally cover most common words with their associated pronunciations and provide these to the Lexicon Builder 110.

The Lexicon Builder 110 may serve to integrate the Pronunciation Dictionaries 105, the Spelling-to-Pronunciation (STP) interpreter 115, and the Text Normalizer 120. The Lexicon Builder 110 may convert rules and regulations specified in each of these components to a machine-understandable language (such as binary files). The final output of the Lexicon Builder 110 accepts words or names as inputs and outputs a list of acceptable pronunciations (i.e., phoneme sequences).

The STP Interpreter 115, or the Spelling-To-Pronunciation (STP) Interpreter, may serve to generate pronunciations for words that are not common enough to be included in the Pronunciation Dictionaries 105.

The Text Normalizer 120 may divide words into a number of parts and extract common parts of similar words. In an embodiment, a word may be divided into three parts, such as the prefix, body, and postfix.

The Name Lexicon 125 may specify how the name, or word, is pronounced, or what correct pronunciations for each are acceptable. Reference pronunciations may be provided in the form of phoneme sequences for names to be recognized.

The Grammar-based Recognizer 130 may receive name pronunciation input and provide a hypothesized name based on an Acoustic Model 140 and specified lexicon (e.g., Name Grammar 145) to the Scoring Module 150. Information may be received from several sources. As illustrated in FIG. 1, the Speech Corpus 135, Name Lexicon 125, Name Grammar 145, and the Acoustic Model 140 provide inputs to the Grammar-based Recognizer 130. Using information from the different inputs, the Grammar-based Recognizer 130 determines the hypothesized phoneme sequences based on comparing input audio with acoustic models on a frame-by-frame basis.

The Speech Corpus 135 may comprise audio data containing pronunciations of names that are to be recognized. The audio data may be input to the Grammar-based Recognizer 130 and the Scoring Module 150.

The Acoustic Model 140 models each phoneme in the phoneme alphabet and allows pronunciations of names to be recognized as phoneme sequences. The Acoustic Model 140 may be based on a model such as a Hidden Markov Model and Gaussian Mixture Model. In an embodiment, each phoneme in the whole phoneme space is made distinguishable through training Different training methods may be applied, such as Maximum Likelihood Estimation training (MLE), for example, or discriminative training based on linear discriminative analysis. Mel-Frequency Cepstral Coefficients (MFCCs) may also be used as an acoustic feature for training with Cepstral Mean and Variance Normalization (CMVN).

The Name Grammar 145 may specify words, or names, for recognition by the Grammar-based Recognizer 130. Names that are not included in the grammar 145 may only be recognized as the most similar name specified in the grammar.

The Scoring Module 150 may receive input audio utterances and the Grammar-based Recognizer 130 output results. These results are evaluated along with transcription 137 from the Speech Corpus 135 using scoring tools. The output of the recognizer comprises a hypothesized name which is compared to the referenced name in the Scoring Module 150. If the hypothesized name is determined to be similar or the same as the reference name, then it may be determined to be correctly recognized. Otherwise, it has not been correctly recognized and any pronunciations learned for it should be discarded.

In an embodiment, the Scoring Module 150 associates a Total Confidence Score (TCS) and broken-down Word Confidence Scores (WCS) with the input. The TCS may be formulated by dividing the probability of the observation given a name by the probability of the name-level observation. The WCS may be found by dividing the probability of the observations given the word by the probability of the word-level observation. In an embodiment the TCS and WCS may comprise a range from 0 to 1. In another embodiment, a higher score indicates higher accuracy.

The Recognition Results 155 comprise the remaining learned pronunciations after pruning the results from the Grammar-based Recognizer 130.

Candidate Pronunciation Generation

In order to find alternative pronunciations for a given word or name, a list of candidate pronunciations needs to be generated for that given word or name. Using the word "paine" as an example, the reference pronunciation contains three phonemes such that $[p_1, p_2, p_3]=[p, ey, n]$. There are 1, 3, and 1 phonemes that can substitute the original phonemes such that

[b] for $p_1=[p]$

[eh, iy, ih] for $p_2=[ey]$; and

[ng] for $p_3=[n]$.

For each phoneme $p_m$, $m \in [1,3]$, the numbers of phoneme candidates including the original phoneme itself $N_m$, are 2, 4, and 2 respectively. The total number of candidate pronunciations X can be determined by the number of arbitrary combination of candidate phonemes in each phoneme position:

$$X=\Pi_{m=1}^{M} N_m.$$

In the reference pronunciation of "paine", there are three phonemes, thus, M=3 and there are 16 candidate pronunciations since X=2*4*2=16.

Linguistic and acoustic phoneme confusion matrices may be applied to find similar phonemes for each phoneme in the alphabet. Phonemes may be mispronounced because they sound similar or they are easily confused for non-native speakers. The acoustic confusion matrix may contain values indicating how each phoneme pair sounds similar. In an embodiment, the smaller the values, the more similar the sound. The acoustic confusion matrix may be obtained through phoneme recognition experiments on test sets of speech data. The linguistic confusion matrix may contain binary values indicating whether the phoneme pair belongs to the same linguistically defined phoneme clusters. For example, a value of zero may indicate that the two phonemes belong to the same cluster and are easy to confuse. The linguistic confusion matrix may be provided by a group of linguistic experts.

A union confusion matrix may be constructed from the acoustic and linguistic confusion matrices to indicate the overall similarity of each phoneme pair. For each phone, the remaining phonemes may be placed in ascending order by similarity values. The phonemes may then be grouped into clusters and the phonemes most similar to the original phoneme are chosen as candidate phonemes. In an embodiment, a k-means algorithm may be used to perform the grouping.

Figure 2:
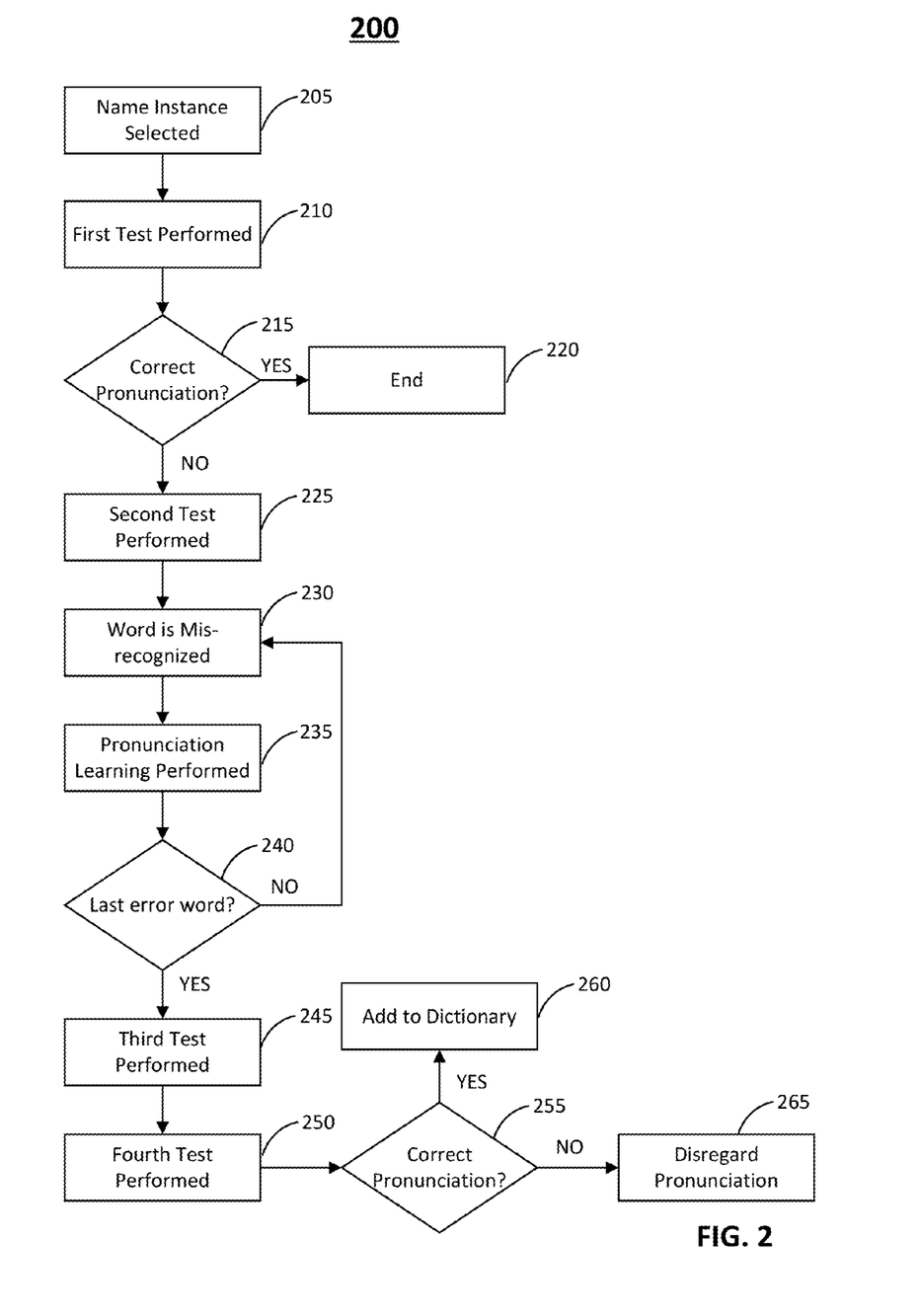
FIG. 2 is a flowchart illustrating an embodiment of a process for pronunciation learning.

FIG. 2 is a flowchart illustrating an embodiment of a process for pronunciation learning for misrecognized name instances indicated generally at 200. A number of name recognition tests are described along with hierarchical pronunciation learning of misrecognized words. In this example, four tests are described. However, it is within the scope of this embodiment to have fewer or more tests depending on the number of optional tests performed as indicated below. These tests comprise single-grammar name recognition and multiple-grammar name recognition. Single-grammar name recognition may be used to measure the accuracy of pronunciations. Multiple-grammar name recognition may be used to test all names to determine whether the pronunciation can aid in correctly recognizing the specified name instance from a set of all possible names.

In operation 205, a name instance is selected. For example, a name instance is selected for name recognition tests and hierarchical pronunciation learning of misrecognized name instances. Original pronunciations of the name instance may be obtained from sources such as linguistic dictionaries or automatic word-to-phone generators. Consider a sample grammar that specifies three words: "apple", "banana", and "orange". The input audio recording contains a pronunciation of the word "apple". Control is passed to operation 210 and process 200 continues.

In operation 210, a first test is performed. For example, regular (or multi-grammar) name recognition may be performed on the current name instance with all available pronunciations (i.e., the reference pronunciations). A baseline recognition result may be provided, such as whether or not the reference name and hypothesized name can be declared a match. A Total Confidence Score (TCS) may also be provided for the name instance. In an embodiment, all name instances may have already gone through the baseline recognition process and the name instances with recognition errors have been separated for pronunciation learning. Using the example from above with the word "apple", the recognizer will recognize from the input whether it contains a word in the grammar: "apple", "banana", "orange", or simply no match. Control is passed to operation 215 and process 200 continues.

In operation 215, it is determined whether or not the reference name and the hypothesized name are a match. If the reference name and the hypothesized name are a match, control is passed to operation 220 and the process ends. Another name instance may be selected to begin the process anew. If the reference name and the hypothesized name are not a match, control is passed to operation 225 and process 200 continues.

In an embodiment, the remainder of the process may be skipped if the pronunciation of the word "apple" is correctly recognized as the word "apple" in the grammar. A new input may be selected for a new run of the process. If the pronunciation is not correctly recognized, another test may need to be performed.

In operation 225, a second test is performed. In an embodiment, single grammar name recognition may be performed on the name instance. The reference name must be identical to the hypothesized name, e.g., the name recognizer is constrained to only recognize the name instance. For example, the word "apple" may be kept in the grammar and the words "banana" and "orange" removed. Thus, the recognizer can only recognize any input as "apple" or report no match. The recognizer will pick up the word giving the highest TCS. By removing the words "banana" and "orange" from the recognizer, the recognizer is forced to show the TCS for the word "apple", even if it wasn't the word with the highest TCS to start with. The pronunciation for "apple" may then be improved upon to make the recognizer pick the correct word "apple". The purpose of the second test, in an embodiment, is to determine how difficult it may be to recover on the misrecognition and is optional for the entire process of pronunciation learning. Generally, the TCS from the second test is smaller than the TCS value from the first test. Control is passed to operation 230 and process 200 continues.

In operation 230, a word is identified as misrecognized. Control is passed to operation 235 and process 200 continues.

In operation 235, pronunciation learning is performed. For example, candidate pronunciations are compiled and the best pronunciation may be selected. The best pronunciation may be that which gives the highest score to recognize the target word. Control is passed to operation 240 and the process 200 continues.

In operation 240, it is determined whether or not the word has been correctly recognized. If it is determined if the word has been correctly recognized, control is passed to operation 245 and the process 200 continues. If it is determined that the word has not been correctly recognized, control is passed back to operation 230 and process 200 continues. The determination in operation 240 may be made, in an embodiment, by examining the TCS values.

In operation 245, a third test is performed. In an embodiment, a single-grammar name recognition of the name instance is performed where the learned pronunciation of the word instance from building the lexicon model is included. In an embodiment, the TCS value from the third test should be larger than the TCS value from the second test. This result may indicate that the learned pronunciation is better than the reference pronunciation. This test may also be optional and used as an assessment of the effect of adding the learned pronunciation. Control is passed to operation 250 and process 200 continues.

In operation 250, a fourth test may be performed. In an embodiment, multi-grammar name recognition may be performed with the learned pronunciation of the name instance. Unlike the described tests in operations 225 and 245, this test is not optional. In an embodiment, with the new pronunciation found, the original grammar from the first test described in process 210 may be applied again and the new pronunciation tested to determine if "apple" is correctly recognized.

In operation 255, it is determined whether or not the reference word is the same as the hypothesized word. If the reference word is the same as the hypothesized word, control is passed to operation 260 and process 200 continues. If the reference word is not the same as the hypothesized word, control is passed to operation 265 and process 200 continues.

For example, a comparison may be made of the TCS values from the described fourth test and the described first test. In an embodiment, if the TCS value for the fourth test is greater than the TCS value from the first test, the name instance is corrected.

In operation 260, the learned pronunciation of the name instance is added into the learned dictionary and the process ends.

In operation 265, the learned pronunciation of the name instance is discarded and the process ends.

Figure 3:
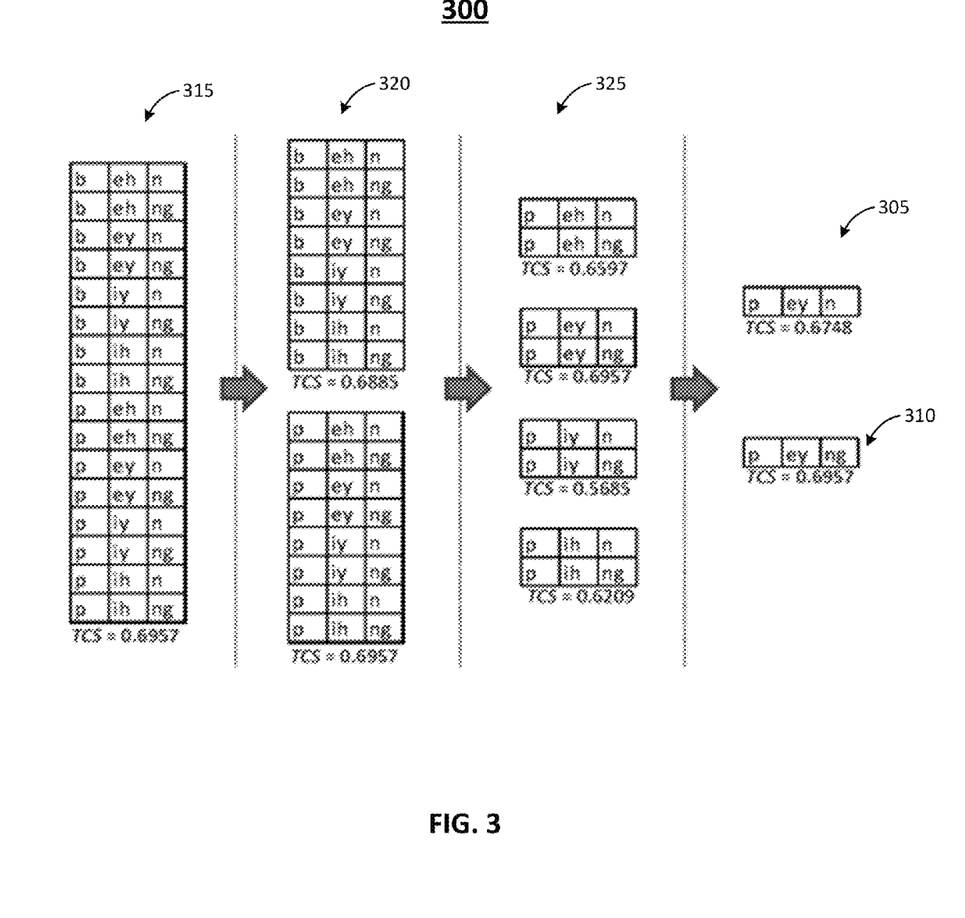
FIG. 3 is a diagram illustrating an embodiment of hierarchical pronunciation learning.

FIG. 3 is a diagram illustrating an embodiment of hierarchical pronunciation learning for a word, indicated generally at 300. Using the word "paine" as an example, with the reference pronunciation [p, ey, n] and 16 candidate pronunciations, the selected phoneme in the best pronunciation may be determined phoneme by phoneme using hierarchical pronunciation learning.

Given Y names specified in Name Grammar 145, each name has $X_y$ reference pronunciations, where $y \in [1, Y]$ represents the name index. The total number of reference pronunciations X may be mathematically represented as:

$$X = \sum_{y=1}^{Y} X_y \geq Y \text{ and } X_y \geq 1.$$

The Grammar-based Recognizer 130 may output the highest TCS value associated with the optimal pronunciation found $P_{x^*}$ from name $N_{y^*}$, where $$x^* = \underset{x}{\operatorname{argmax}}(TCS_x) \text{ and}$$

$$y^* = \underset{y}{\operatorname{argmax}}(TCS_x)$$

represent the optimal pronunciation and the corresponding name. Single-grammar recognition may be performed, where a name $N_{y^*}$ is specified in the Grammar 145. Hierarchical pronunciation learning is employed to select phonemes $p(n_m)$ in $x^*$, where $n_m \in [0, N_m-1]$ and $m \in [1, M]$ represents the index of the phoneme candidate for the $m^{th}$ phoneme unit. The sequence of selected phones then becomes the learned pronunciation. In FIG. 3, the reference and the learned pronunciations of the word "paine" are [p ey n] 305 and [p ey ng] 310 respectively. Multiple single-grammar experiments with subsets of candidate pronunciations are performed in three iterations in which the phonemes /p/, /ey/, and /ng/ in the learned pronunciation 310 of "paine" are determined by tracking subsets with the highest TCS in each iteration. In this example, eight runs of the name recognition produced 26 candidate pronunciations of "paine" as opposed to testing all 16 pronunciations illustrated at 315 in 16 runs.

In this example, the phonemes may be determined in the natural order. The first phoneme position in 315 is either [b] or [p]. The second phoneme position 320 is either [eh], [ey], [iy], or [ih]. The third phoneme position 325 is either [n] or [ng]. As a result, the best pronunciation is determined through iterations, reducing the total number of runs from 16 to 8.

Pronunciation Pruning

Pronunciation pruning may be performed to avoid negative impact to other names when adding additional pronunciations to the target name. In an embodiment, a test may be performed. The test may be comprised of two metrics which check the recognition accuracy on a subset of similar names (including the target name) with or without the learned pronunciation to be verified.

For example, given a name recognizer capable to recognize a large number of names, all name instances of the most similar names are selected, including the target name, to form a subset for testing. The overall accuracy on the subset is examined. If the overall accuracy on the subset is lower when adding the learned pronunciation of the name instance into the dictionary, then the learned pronunciation is disregarded. Otherwise, the learned pronunciation is retained in the learned dictionary.

The similarity between names may be determined through the use of dynamic programming of the pronunciations, similar to Dynamic Time Warping (DTW) used to compute the similarity of two pronunciations and the time alignment of them. The percentage of names selected to form the subset may be adjusted based on the desired strictness of pruning Other pruning techniques may be applied. In an embodiment, during pronunciation learning, less important words in a misrecognized name may be skipped if learning additional pronunciations for the more important word has already helped correct misrecognition. Words may be sorted by importance, which can be achieved by comparing the improvement of a WCS from test 2 to test 3, as mentioned in the process 200. In another embodiment, after collecting all of the learned pronunciations through pronunciation learning, the learned pronunciations of each word in the database are limited. The limit may be two learned pronunciations, for example. The limit may be chosen based on the following criteria:

(1) Group all name instances containing the current target word to form a name subset of the target word.

(2) For each learned pronunciation, perform single-grammar name recognition for each name instance in this subset one by one and obtain the average WCS as the evaluation score for the learned pronunciation.

(3) Order the learned pronunciations by their evaluation scores and keep the number of desired pronunciations, which would be two in this example.

Efficiency Control

A number of approaches may be used to improve the efficiency of learning pronunciation. In an embodiment, dynamic search radius reduction may be applied to words with large numbers of candidate pronunciations. Pronunciation learning cost is dependent upon the number of candidate pronunciations, which can be extremely large when the name or word to be learned contains a long phoneme sequence. For each phoneme in the original pronunciation, a set of similar phonemes may be filtered out by their acoustic and linguistic similarity and k-mean clustering. The similarity value of the least similar phoneme candidate in a set may be defined as the search radius or threshold $r_m$, when the length of the $P_{REF} M > M_{max}$, $r_m$ will be mathematically reduced to:

$$r'_m = \left(\frac{M_{max}-1}{M-1}\right) r_m$$

where $M_{max}$ represents the threshold, $P_{REF}$ represents the reference pronunciation, and M represents the length of the phoneme sequence.

Figure 4:
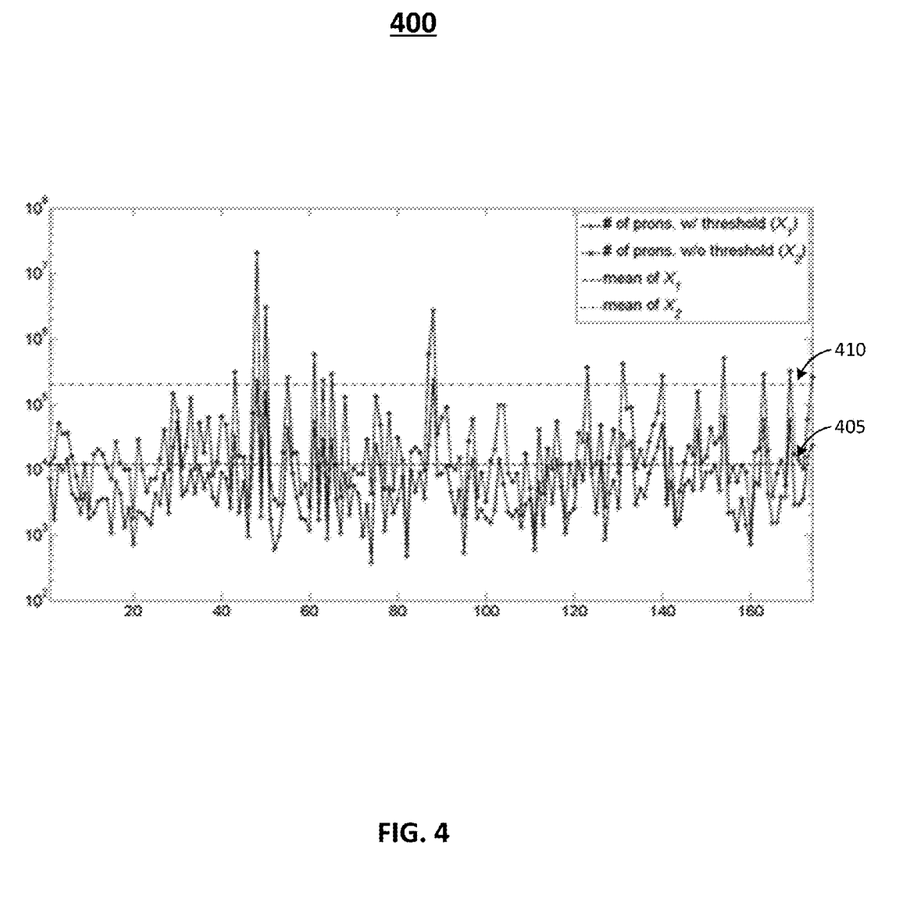
FIG. 4 is a graph illustrating an embodiment of a comparison of candidate pronunciations.

FIG. 4 is a chart displaying a comparison of the number of candidate pronunciations with or without dynamic threshold in a database, indicated generally at 400. The horizontal axis represents the number of words which trigger radius reduction. The vertical axis represents the number of candidate pronunciations before and after the radius reduction, presented in log scale. The lines 405 and 410 represent the average of the curves for the number of pronunciations within the threshold 410 and the number of pronunciations not within the threshold 405. The threshold may be empirically determined. For example, the database may contain 586 names and 916 words. Out of 916 words, only 174 (or 19%) have long pronunciations that trigger the dynamic threshold reduction. The average number of candidate pronunciations may be significantly reduced from 20204 ($X_2$) (represented as 410 in FIG. 4) to 11941 ($X_1$) (represented as 405 in FIG. 4), which is lower than 60% of the original average.

In another embodiment, phoneme determination order optimization may be applied. Using the word "paine", which contains the three phonemes [p, ey, n] in the reference pronunciation and the number of candidates for each phoneme is 2, 4, and 2, phoneme determination may be implemented in the descending order of the phoneme candidates.

Figure 5:
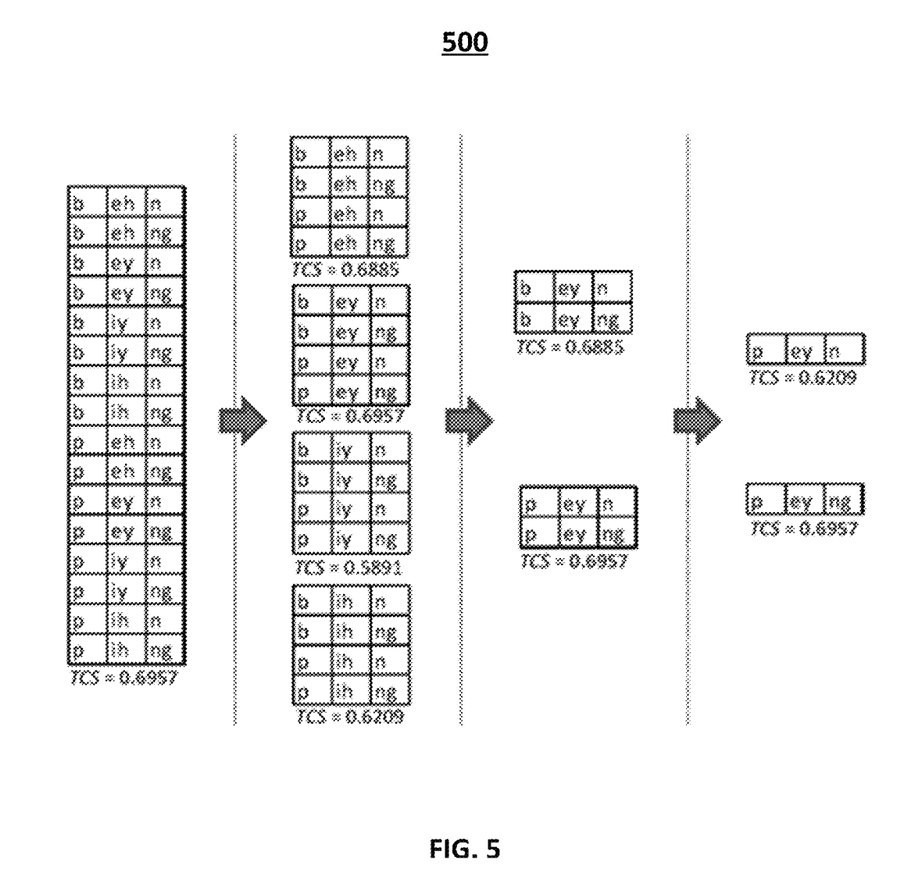
FIG. 5 is a diagram illustrating an embodiment of hierarchical pronunciation learning.

FIG. 5 a diagram illustrating an embodiment of hierarchical pronunciation learning, indicated generally at 500. Specifically, FIG. 5 illustrates an example of hierarchical pronunciation learning, based on the descending order of the number of candidate phonemes in each phoneme position. The total number of pronunciations processed is 22 (16, 4, 2). Comparing this determination to that in FIG. 3, the total number of pronunciations processed is smaller than the 26 processed in FIG. 3 as described above.

Figure 6:
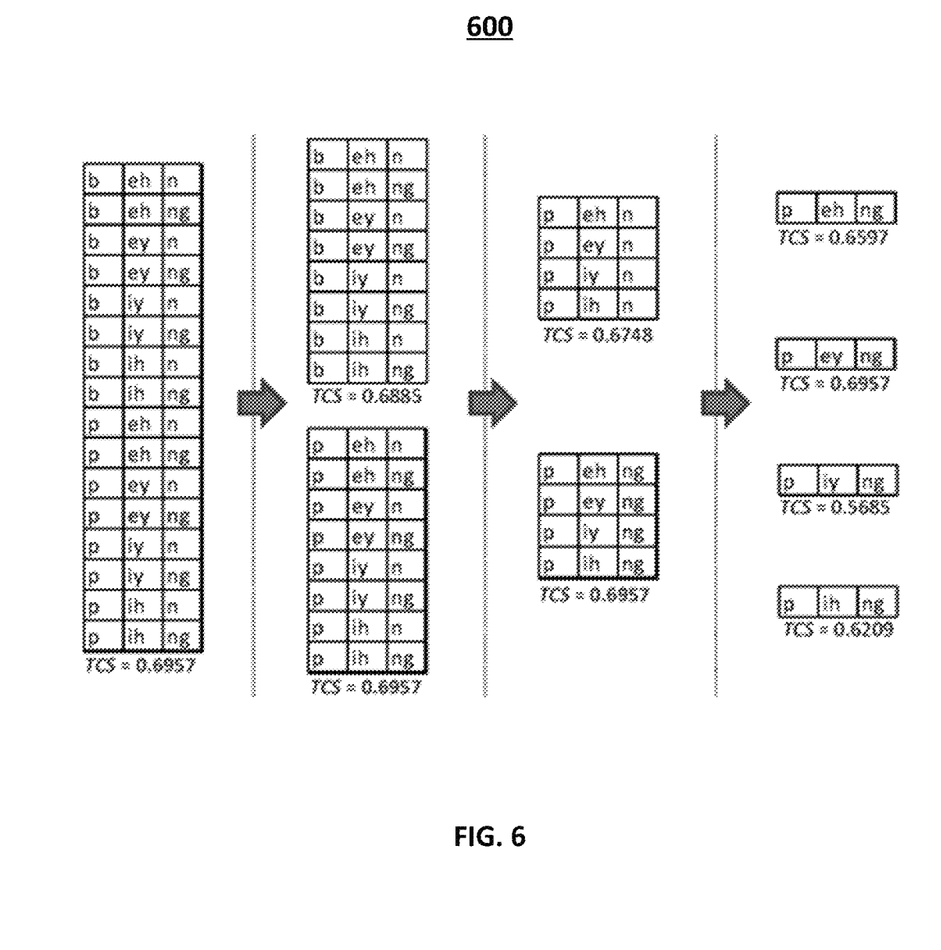
FIG. 6 is a diagram illustrating an embodiment of hierarchical pronunciation learning.

FIG. 6 is a diagram illustrating an embodiment of hierarchical pronunciation learning, indicated generally at 600. The hierarchical pronunciation learning is based on the ascending order of the number of candidate phonemes in each phoneme position. Specifically, FIG. 6 displays the inefficiency of determining phonemes in ascending order as the total number of pronunciations for processing is 28 (16, 8, 4).

In an embodiment, the dictionary of learned pronunciations may be used in a grammar based speech recognition task to improve speech recognition accuracy.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for learning pronunciation in a given language comprising the steps of:
    a. training an acoustic model on a large speech corpus to distinguish phonemes;
    b. constructing a phoneme confusion matrix;
    c. constructing a phoneme replacement candidate list for each phoneme in a set of speech data containing pronunciations for recognition;
    d. learning alternative pronunciations of a word that has been mispronounced;
    e. combining said learned alternative pronunciations with a linguistic dictionary to create a pooled dictionary; and
    f. pruning said pooled dictionary to limit the number of learned alternative pronunciations in order to create an improved dictionary.

2. The method of claim 1, wherein the acoustic model in step (a) is trained by one of: maximum likelihood criterion and discriminative training criterion.

3. The acoustic model of claim 1, wherein said acoustic model in step (a) is based on a Hidden Markov Model and Gaussian Mixture Model.

4. The method of claim 1, wherein step (b) further comprises the step of merging an acoustic confusion matrix with a linguistic confusion matrix to construct said phoneme confusion matrix.

5. The method of claim 4, wherein said acoustic confusion matrix is obtained by performing a phoneme recognition experiment on a test set of speech data.

6. The acoustic confusion matrix of claim 5, wherein a low value in the acoustic confusion matrix indicates a phoneme is similar to other phonemes and confusable.

7. The linguistic confusion matrix of claim 4, wherein the linguistic confusion matrix is provided by a group of linguistic experts.

8. The linguistic confusion matrix of claim 7, wherein the linguistic confusion matrix comprises a binary matrix comprising the numbers 0 and 1.

9. The linguistic confusion matrix of claim 8, wherein 0 indicates that a phoneme belongs to the same confusion cluster as an other phoneme and the phonemes are confusable.

10. The method of claim 1, wherein step (c) further comprises the steps of:
    a. selecting a phoneme from the speech data as a target phoneme for analysis and arranging the remaining phonemes based on distance to the target phoneme;
    b. applying a statistical clustering algorithm to similarly group the arranged phonemes;
    c. constructing the list of phoneme replacement candidates for the target phoneme from the similarly grouped phonemes; and
    d. repeating all of the steps for each phoneme in the speech data set.

11. The method of claim 10, wherein the distance between a phoneme and said target phoneme in step (a) represents a confusion value in a phoneme confusion matrix.

12. The phoneme confusion matrix of claim 11, wherein a low value indicates high confusion between a phoneme and a target phoneme.

13. The method of claim 1, wherein step (d) further comprises the steps of:
    a. obtaining the original pronunciation for each word that has been misrecognized;
    b. generating an alternative pronunciation data set wherein an improved new pronunciation is compared with an original pronunciation;
    c. performing recognition on the alternative pronunciation data set, the acoustic model, and the set of speech data;
    d. determining the best pronunciation from the alternative pronunciation data set;
    e. retaining selected pronunciations from said alternative pronunciation data set; and
    f. repeating the steps for all misrecognized words to form the learned pronunciation data set.

14. The method of claim 13, wherein the original pronunciation in step (a) is obtained from one of: a linguistic dictionary and an automatic word-to-phoneme generator.

15. The method of claim 13, wherein step (b) further comprises the steps of:
    a. placing groups of phonemes in their respective positions; and
    b. obtaining all of the phoneme combinations.

16. The determination of the best pronunciation of claim 13, wherein the best pronunciation of the word in step (d) results in the highest recognition accuracy.

17. The method of claim 16, wherein step (b) further comprises the step of: determining the size of the alternative pronunciation data set by the mathematical equation:

$$X = \Pi_{m=1}^{M} N_m.$$

18. The method of claim 13, wherein the recognition of step (c) is performed using a Viterbi decoding algorithm.

19. The linguistic dictionary of claim 1, wherein the linguistic dictionary comprises a set of pronunciations of common words in a language and is provided by a group of linguistic experts.

20. The method of claim 1, wherein creation of the improved dictionary in step (f) further comprises the steps of:
    a. computing a distance from each word to an other word in the linguistic dictionary;
    b. creating a subset of similar words for each misrecognized word;
    c. performing recognition on the subset of similar words, the acoustic model and the set of speech;
    d. identifying the frequency of failure;
    e. removing a pronunciation contributing to frequency failure greater than a threshold; and
    f. repeating the process for all misrecognized words.

21. The method of claim 20, wherein computing of step (a) comprises a dynamic programming algorithm based on word pronunciations.

22. The method of claim 21, wherein the dynamic programming algorithm uses the accumulative confusion values in the phoneme confusion matrix as costs in computation.

23. The confusion values of claim 22, wherein a low value indicates word similarity.

24. The method of claim 20, wherein step (b) further comprises the step of selecting a number of words based on a threshold.

25. The method of claim 20, wherein step (d) further comprises the step of identifying incorrect recognitions, a pronunciation associated with an incorrect recognition, and the frequency of failure related to an incorrect recognition.

26. The method of claim 20, wherein the recognition of step (c) is performed using a Viterbi decoding algorithm.

27. The method of claim 1, wherein step (f) further comprises the step of: applying the improved dictionary in a grammar based speech recognition task to improve speech recognition accuracy.

28. The method of claim 1 further comprising the step of optimizing the efficiency of learning alternative pronunciations, wherein said optimizing comprises one or more of the following:
   a. reducing the length of a phoneme replacement candidate list for each phoneme in the original pronunciation of the a word that has been mispronounced if a number of candidate pronunciations exceed a threshold; and
   b. optimizing a phoneme determination order when obtaining a desired pronunciation for a misrecognized word.

29. The method of claim 28, wherein step (a) further comprises the step of determining the scale of length reduction of a phoneme replacement candidate list with the mathematical equation:

$$r'_m = \left(\frac{M_{max}-1}{M-1}\right)r_m.$$

30. The method of claim 28, wherein the phoneme determination order in step (b) continues from a phoneme with the longest phoneme replacement candidate list and continues in the descending order of the length of phoneme replacement candidate list for each phoneme.

31. A method for learning alternative pronunciations for speech in a given language comprising the steps of:
   a. selecting a word instance for learning alternative pronunciations;
   b. performing a first test on the word instance to determine a baseline recognition result;
   c. performing hierarchical pronunciation learning on the word instance and selecting a pronunciation that is similar to the word instance; and
   d. performing an other test to assess if the selected pronunciation is recognized as the word instance wherein if the word is recognized, adding the selected pronunciation to a dictionary, otherwise, discarding the selected pronunciation.

32. The method of claim 31, wherein the first test comprises multi-grammar recognition with reference pronunciations.

33. The method of claim 32, wherein the reference pronunciations are scored against the word instance to determine matches.

34. The method of claim 31, wherein the hierarchical pronunciation learning comprises learning alternative pronunciations for the word instance through iterations.

35. The method of claim 31, wherein the other test comprises multi-grammar recognition.

36. A system for language learning of mispronunciation detection comprising:
   a. a lexicon builder which is capable of integrating one or more of: pronunciation dictionaries, spelling-to-pronunciation interpretations, and text normalizations, to create a list of acceptable phoneme sequences;
   b. a speech corpus;
   c. an acoustic model;
   d. a word lexicon;
   e. a word grammar;
   f. a grammar-based recognizer which provides a hypothesized name based on the speech corpus, acoustic model, word lexicon, and the word grammar to a means for scoring; and
   g. a means for scoring which indicates accuracy of the hypothesized name.

37. The system of claim 36, wherein the pronunciation dictionaries comprise a learned dictionary, a linguistic dictionary, and prototype dictionary.

* * * * *